United States Patent [19]

Hawley et al.

[11] Patent Number: 5,024,982
[45] Date of Patent: Jun. 18, 1991

[54] SILICA-CONTAINING OLEFIN POLYMERIZATION CATALYSTS AND PROCESS

[75] Inventors: Gil P. Hawley, Dewey; Max P. McDaniel, Bartlesville, both of Okla.

[73] Assignee: Phillips Petroleum Company, Bartlesville, Okla.

[21] Appl. No.: 284,280

[22] Filed: Dec. 14, 1988

[51] Int. Cl.$^5$ .............................................. C08F 4/64
[52] U.S. Cl. .................................. 502/110; 502/104; 502/111; 502/117; 502/119; 502/120; 526/125
[58] Field of Search ............... 502/104, 110, 111, 117, 502/119, 120

[56] References Cited

U.S. PATENT DOCUMENTS

| | | | |
|---|---|---|---|
| 3,008,943 | 11/1961 | Guyer | 260/93.7 |
| 3,135,809 | 6/1964 | Bosmajian | 502/114 X |
| 4,061,724 | 12/1977 | Grose et al. | 423/335 |
| 4,073,865 | 2/1978 | Flanigen et al. | 423/339 |
| 4,173,547 | 11/1979 | Graff | 252/429 B |
| 4,218,339 | 8/1980 | Zucchini et al. | 252/429 B |
| 4,284,748 | 8/1981 | Welch | 526/119 |
| 4,315,999 | 2/1982 | Matsuura et al. | 526/114 |
| 4,391,736 | 7/1983 | Capshew | 252/429 B |
| 4,394,291 | 7/1983 | Hawley | 252/429 B |
| 4,427,573 | 1/1984 | Miles et al. | 502/111 |
| 4,477,588 | 10/1984 | Hawley | 502/119 |
| 4,492,768 | 1/1985 | Hawley | 502/111 |
| 4,503,159 | 3/1985 | Masino et al. | 502/111 |
| 4,520,121 | 5/1985 | Inkrott et al. | 502/105 |
| 4,537,870 | 8/1985 | Hawley | 502/111 |
| 4,544,716 | 10/1985 | Hawley | 526/119 |
| 4,567,155 | 1/1986 | Tovrog et al. | 502/123 |
| 4,618,595 | 10/1986 | Dietz | 502/108 |
| 4,719,271 | 1/1988 | Dietz | 526/114 |

*Primary Examiner*—Patrick P. Garvin
*Attorney, Agent, or Firm*—Beverly M. Dollar

[57] ABSTRACT

Method for making crystalline polymerization catalysts is disclosed which comprises contacting the soluble complex prepared from the combination of a metal dihalide and a transition metal compound with a particulate material comprising silica to produce a solid, and then reacting the solid with an organoaluminum halide. The resulting catalyst component can be further contacted with a halide ion exchanging source selected from halides of Groups IVA and VA. Novel catalysts prepared in accordance with the invention method, polymerization processes therewith and novel polymers, having high bulk density, low levels of polymer fines, and well defined particle size and shape are also disclosed.

19 Claims, 5 Drawing Sheets

CRYSTALLINE POLYMERIZATION CATALYST
CONTAINING SILICA

CRYSTALLINE POLYMERIZATION CATALYST
CONTAINING SILICALITE

FIG. 3

CRYSTAL-LIKE APPEARING POLYMER
PREPARED USING CATALYST CONTAING SILICATE

SILICA-CONTAINING OLEFIN POLYMERIZATION CATALYSTS AND PROCESS

This invention relates to a process for forming crystalline catalysts which can be used with a cocatalyst to form a catalyst system for the polymerization of $\alpha$-olefins. In one aspect, the present invention relates to novel polymerization catalysts. In another aspect, the present invention relates to a process for polymerizing $\alpha$-olefins. In yet another aspect, this invention relates to novel polymers of $\alpha$-olefins.

BACKGROUND OF THE INVENTION

The polymerization of $\alpha$-olefins and mixtures thereof at low pressures is known to be promoted by coordination catalysts prepared from mixtures of compounds of (a) transition elements, and (b) organometallic compounds of elements of Groups IA to IIIA of the Periodic Table. Such polymerizations can be carried out in suspension, in solution, in the gas phase, and the like.

Because of favorable process economics, especially with low molecular weight olefins such as ethylene and propylene, it is frequently desirable to carry out olefin polymerization or copolymerization reactions in an inert diluent at a temperature at which the resulting polymer or copolymer does not go into solution; and where the polymer product is recovered without removing the polymerization catalyst. Thus, elaborate steps to remove catalyst from the polymer product are avoided. In order for this more economical method of polymer manufacture to be practical, the polymerization catalyst employed must be capable of producing polymer in high productivities in order to maintain the residual catalyst level in the final polymer at a very low level. Thus, the activity of an olefin polymerization catalyst is one important factor in the continuous search for catalysts useful for the polymerization of $\alpha$-olefins. It is also desirable that the process used in forming such catalysts allow for ease of preparation and ready control over the properties of the final catalyst formed.

Another important aspect of a polymerization catalyst and polymerization process employing same is the properties of the polymer particles produced. It is desirable to produce polymer particles which are characterized by strength, uniformity of size, and a relatively low level of fine particulate matter. Although polymer fluff having relatively high percentages of polymer fines can be handled with plant modifications, the production of polymers in high productivity with low level of fines content is highly desirable so as to avoid the need for such plant modifications. Especially desirable are polymer particles having a high bulk density and relatively uniform shape as well as size.

OBJECTS OF THE INVENTION

It is an object of the present invention, therefore, to provide a novel and improved method for preparing catalyst compositions.

Another object of the present invention is to provide a novel catalyst composition well adapted for the polymerization of $\alpha$-olefins.

A further object of the present invention is to provide an improved process for the polymerization of $\alpha$-olefins.

Yet another object of the present invention is to provide polymer compositions having high bulk densities, relatively low levels of polymer fines and relatively uniform shape and size.

These and other objects of the present invention will become apparent from the disclosure, figures and claims herein provided.

STATEMENT OF THE INVENTION

In accordance with the present invention, we have discovered that polymer particles having low levels of polymer fines, high bulk density, and relatively uniform shape and size are obtained when prepared by polymerization of $\alpha$-olefins with high activity, high stereospecificity heterogeneous olefin polymerization catalysts prepared by contacting a soluble complex (produced by contacting a metal dihalide with a transition metal compound) with a predominantly silica-containing particulate material prior to contacting the supported complex with an organoaluminum halide. After treatment with the organoaluminum halide the resulting catalyst component is activated for polymerization by treatment with an activating agent comprising Group IVA or IVB halides.

DETAILED DESCRIPTION OF THE INVENTION

In accordance with the present invention, there is provided a method for the preparation of a first olefin polymerization catalyst component which comprises:

(a) contacting at least one metal dihalide selected from the group consisting of Group IIA and IIB dihalides with at least one transition metal compound in the presence of a diluent under conditions suitable for the formation of a soluble complex;

(b) contacting the soluble complex produced in accordance with step (a) with 0.1 to 20 weight percent, based on the weight of the soluble complex, of a predominantly silica-containing particulate material to produce a first solid;

(c) contacting said first solid with 0.1 to 10 mole of an organoaluminum halide per mole transition metal compound to produce said first catalyst component.

Optionally, the first olefin polymerization catalyst component can be further contacted with a halide ion exchanging compound The first olefin polymerization catalyst component can also be further contacted with a cocatalyst, if desired.

Further in accordance with the present invention, there are provided novel catalyst compositions produced as described hereinabove.

Still further in accordance with the present invention there is provided a process for the polymerization of $C_2$ up to $C_{20}$ $\alpha$-olefins which comprises contacting at least one of said $\alpha$-olefins under polymerization conditions with catalyst prepared as described hereinabove.

Still further in accordance with the present invention, there are provided novel polymer compositions produced by carrying out the above described polymerization process. The novel polymers oi the present invention have high bulk density, low levels of polymer fines, reactor soluble polymer which is less atactic and are composed of crystal-like appearing particles.

Examples of Group IIA and IIB metal dihalides that can be used in forming the first component of the catalyst include, for example, the dihalides of beryllium, magnesium, calcium, and zinc. Dichlorides are preferred. Magnesium dichloride is presently preferred because it is readily available and relatively inexpensive and has provided excellent results. While the hydrous or anhydrous form of the metal dihalide can be employed as the starting material for the catalyst; it is desirable that the amount of water in the metal dihalide be from 0.5 to 1.5 moles/mole magnesium dihalide prior to contacting the dihalide with the transition metal compound. Any method known to those skilled in the art to limit the amount of water in the magnesium dihalide can be employed. It is preferred to admix the appropriate amount of water with the anhydrous metal dihalide to achieve the ratios set out above.

The metal dihalide component is generally used in the form of a particulate solid to facilitate its reaction with the transition metal compound. It is also noted that various techniques for converting a metal halide compound to a fine particulate form, such as for example roll milling, reprecipitating, etc., can be used to prepare the metal halide compound for use according to the present invention. Such additional preparation of the metal halide compound promotes the reaction of the metal halide compound with the transition metal compound. It does not appear, however, to make any difference in a catalyst of the present invention prepared from a composition of matter of the present invention if the metal halide compound is in a fine particulate form, since catalyst productivity, for example, does not seem to be a function of the size of the particles of the metal halide compound employed.

The transition metal compounds useful in this invention are those wherein the transition metal is selected from the Groups IVB and VB and the transition metal is bonded to at least one atom selected from the group consisting of oxygen, nitrogen, and sulfur; and said oxygen, nitrogen and sulfur atoms are in turn bonded to a carbon of a carbon-containing radical.

The transition metal is preferably selected from titanium, zirconium and vanadium, although other transition metals can be employed. Excellent results have been obtained with titanium compounds and they are therefore preferred. Some of the titanium compounds that may be used in the instant invention include, for example, titanium tetrahydrocarbyloxides, titanium tetraimides, titanium tetraamides and titanium tetramercaptides. Other transition metal compounds includes, or example, zirconium tetrahydrocarbyloxides, zirconium tetraimides, zirconium tetraamides, zirconium tetramercaptides, vanadium tetrahydrocarbyloxides, vanadium tetraimides, vanadium tetraamides and vanadium tetramercaptides.

The titanium tetrahydrocarbyloxides are presently preferred because they produce excellent results and are readily available. Preferred titanium tetrahydrocarbyloxide compounds include those expressed by the general formula $Ti(OR)_4$ wherein each R is individually selected from an alkyl, cycloalkyl, aryl, alkaryl, and aralkyl hydrocarbon radical containing from about 1 to about 20 carbon atoms per radical and each R can be the same or different. Titanium tetrahydrocarbyloxides in which the hydrocarbyl group contains from about 1 to about 10 carbon atoms per radical are more frequently employed because they are more readily available. Suitable titanium tetrahydrocarhyloxides include, for example, titanium tetramethoxide, titanium dimethoxidediethoxide, titanium tetraethoxide, titanium tetra-n-hutoxide, titanium tetrahexyloxide, titanium tetradecyloxide, titanium tetraeicosyloxide, titanium tetracyclohexyloxide, titanium tetrabenzyloxide, titanium tetra-p-tolyoxide and titanium tetraphenoxide.

Of the titanium tetrahydrocarbyloxides, titanium tetraalkoxides are generally preferred and titanium tetra-n-butoxide is particularly preferred because of the excellent results obtained employing this material. Titanium tetra-n-butoxide is also generally available at a reasonable cost.

The molar ratio of the transition metal compound to the metal halide compounds can be selected over a relatively broad range. Generally the molar ratio is within the range of about 10:1 to about 1:10, however, the most common molar ratios are within the range of about 2:1 to about 1:2. When titanium tetrahydrocarbyloxide and magnesium dichloride are employed to form a composition of matter of the invention, a molar ratio of titanium to magnesium oi about 1:2 is recommended.

The metal halide compound and the transition metal compound employed in the present invention are normally mixed together by heating, e.g. refluxing, in a suitable dry (essential absence of water) solvent or diluent that is essentially inert to these components and the product. The term "inert" is used to mean that the solvent does not chemically react with the dissolved components. Such inert solvents or diluents for the purpose o: the instant invention include, for example, n-pentane, n-heptane, methylcyclohexane, toluene, xylenes and the like. It is emphasized that aromatic solvents are preferred, such as xylene, for example, because the solubilities of the metal halide compound and the transition metal compound are higher in aromatic solvents by comparison to aliphatic solvents, particularly at low mixing temperatures. Such mixing temperatures are generally within the range of from about 0° C. to about 50° C and preferably from about 10° C to about 30° C.

Mixtures of two or more of the above solvents to dissolve the reagents of the first catalyst component can of course also be used and can be readily determined by one of ordinary skill in the art.

Generally the amount of solvent or diluent employed can be selected over a broad range. Usually the amount of solvent or diluent is within the range of about 20 to about 100 cc per gram of metal dihalide. The temperature employed during the heating step can also be selected over a broad range. Normally the heating temperature is within the range of about 15° C. to about 150° C. when the heating step is carried out at atmospheric pressure. Higher heating temperatures can be employed if the pressure employed is above atmospheric pressure.

Generally, the time required for heating these two components together is within the range of about 5 minutes to about 0 hours, although in most instances a time within the range of about 15 minutes to about 3 hours is sufficient. Following the heating operation, the resulting solution can be filtered if desired to remove any undissolved material or extraneous solid.

In one embodiment of the present invention, it has been found that very useful catalyst components result if a third component or set of components is included during the reaction of the dihalide compound and the transition metal compound. Many combinations of third components and specific transition metal compounds provide significant improvements in either productivity or selectivity.

Examples of compounds that may be used as third components include electron donors such as ammonia, hydroxylamine, alcohols, ethers, carboxylic acids, esters, acid chlorides, amides, nitriles, amines, and substituted and unsubstituted phenols, naphthols and their sulfur-containing analogs, i.e. thiophenols. The preferred compounds are aromatic compounds selected from the group consisting of phenols, thiophenols, naphthols, aralkyl alcohols, aromatic acids, and aromatic esters.

The mole ratio of third component compound employed in step (1) relative to the transition metal compound can vary from about 5:1 to about 1:5, preferably about 1:1 to 2:1.

In accordance with an especially preferred embodiment a phenol and an aromatic ester are employed in the reaction between the transition metal compound and the dihalide compound.

The dihalides and the transition metal compounds, as well as optional election donors, as above described, can be reacted in the presence of a liquid diluent or solvent, or when at least one of the reagents is in the liquid state during the reaction the of diluent can be omitted.

In accordance with the present invention, the soluble complex prepared as described above is then contacted with a particulate material consisting essentially of silica. The silica particulate material employed in this invention has a particle size in the range of about 50 up to 200 microns. The silica employed can be either substantially amorphous, substantially crystalline, or material which is a mixture of the two forms, i.e., partially crystalline material. When substantially amorphous silica is employed, such materials are preferably subjected to heat pretreatment before contacting with the soluble complex. Such heat treatment is generally carried out within the range of about 100 up to 900° C., preferably 700°-800° C. In general, it has been found that polymer having a higher bulk density and a higher percentage of crystalline polymer particles is obtained when higher silica pretreatment temperatures are employed, up to a temperature of 800° C., at which temperature the crystalline percentage is maximized.

Substantially crystalline silica (known as silicalite), can alternatively be contacted with the soluble complex in this invention. Silicalites can be prepared in any manner known to those skilled in the art or can be obtained commercially.

In addition to the silicalites used in this invention certain dealuminated zeolites such as dealuminated faujasite can also be employed.

Figure 1:
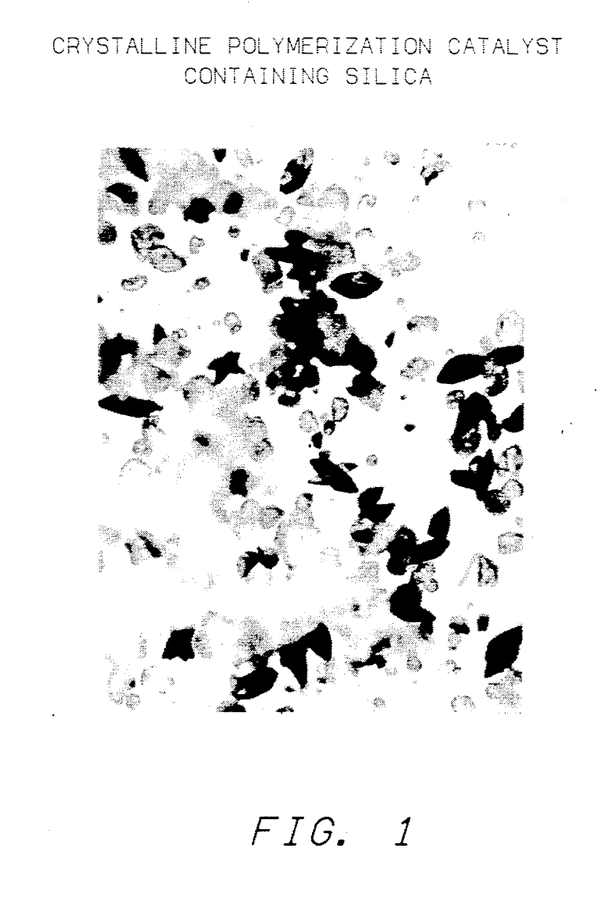
FIGS. 1 and 3 are scanning electron microscope (SEM) photographs of the invention catalyst crystals.
Figure 3:
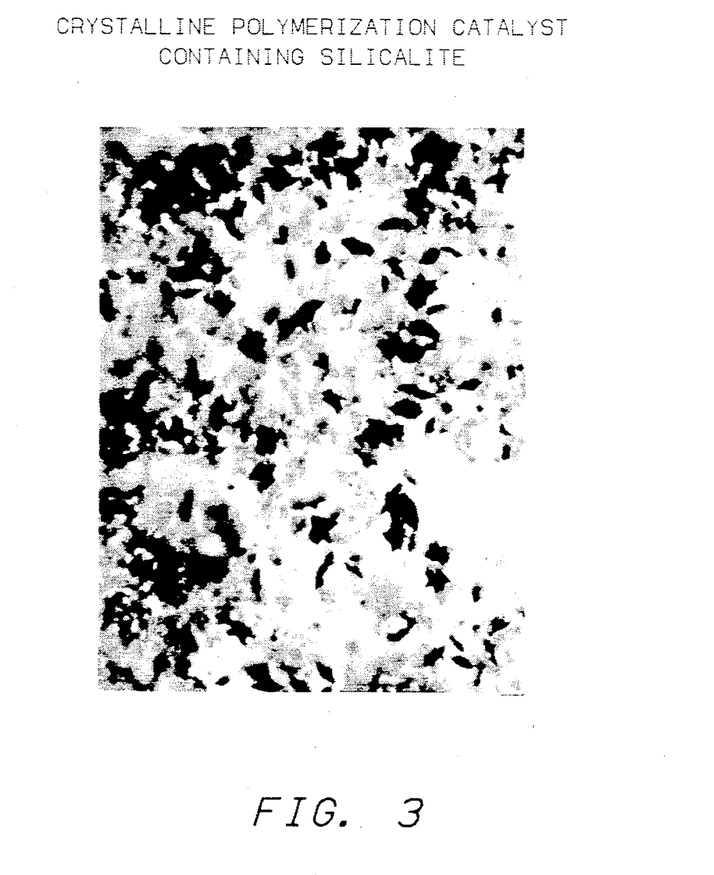

The use of silicalites and the dealuminated zeolites in the preparation of the invention catalyst leads to the production of smaller, less distinct catalyst crystals, and therefore smaller less distinct polymer particles. The polymer particles, however, still resemble crystals and are of high bulk density. The catalyst crystals formed when silica is used and when silicalites are used are depicted in FIGS. 1 and 3, respectively. The quantity of particulate material employed in the practice of the present invention, based on the weight of soluble complex employed, can vary over a wide range. Generally, the weight of silica employed can range from about 0.1 to 30 weight percent, with about 20 weight percent preferred.

The desired quantity oi silica-containing material can be added to the soluble complex once preparation of the soluble complex is complete. The combination of silica and soluble complex can then be stirred at any suitable temperature for any suitable period of time. Generally, such contacting takes place from in the range of about 5 minutes up to 2 hours at a temperature in the range of about 20 up to 100° C., before further treatment of the silica supported soluble complex with an organoaluminum halide as described below.

The organoaluminum halide is selected from compounds having the general formula $AlR_nX_{3-n}$ wherein each R is individually selected from saturated and unsaturated hydrocarbyl radicals containing 1 to 20 carbon atoms per radical, X is a halogen and n is any number such that $1 \leq n \leq 2$. Typical examples include methylaluminum dibromide, ethylaluminum dichloride, ethylaluminum diiodide, isobutylaluminum dichloride, dodecylaluminum dibromide, dimethylaluminum bromide, diethylaluminum chloride, diisopropylaluminum chloride, methyl-p-propylaluminum bromide, di-n-octylaluminum bromide, diphenylaluminum chloride, triethylaluminum, dicyclohexylaluminum bromide, dieicosylaluminum chloride, methylaluminum sesquibromide, ethylaluminum sesquichloride, ethylaluminum sesquiiodide, and the like, and mixtures thereof. Ethylaluminum sesquichloride, ethylaluminum dichloride, and diethylaluminum chloride have been employed with good results and are preferred. The most preferred organoaluminum halide is ethylaluminum sesquichloride.

The reaction with the organoaluminum halide can also be carried out either in the presence of a liquid diluent or in the absence of such diluent. Preferably, the product oi the reaction of the dihalide and the transition metal compound which has been adsorbed on the silica-containing material is contacted with a hydrocarbon solution of the aluminum halide.

The temperature employed while mixing the first solid and organoaluminum halide as above described can be selected over a broad range. Generally the temperature employed is within a range of about 0° C. to about 50° C. or higher, while temperatures within the range of 20° C. to about 30° C. were most often employed. Since heat is evolved when the first catalyst component and the second catalyst component are mixed, the mixing rate is adjusted as required and additional cooling is employed if necessary in order to maintain a relatively constant mixing temperature. After completing the mixing, the resulting slurry is stirred or agitated for a sufficient time, generally within a range of about 15 minutes to about 5 hours to insure that mixing of the components is complete. Thereafter, stirring is discontinued and the solid product recovered by filtration, decantation, and the like. The product is then washed with a suitable material such as a hydrocarbon, e.g., n-pentane, n-heptane, cyclohexane, enxene, xylenes and the like, to remove any soluble material which may be present. The product is reactive and if it is to be stored before use, it must be protected against unwanted reactions and contamination of the catalyst preparation; this requirement is easily met by one possessing ordinary skill in the art.

The molar ratio of the transition metal compound in the first solid catalyst component to the organoaluminum halide can be selected over a relatively broad range. Generally, the molar ratio of the transition metal of the first catalyst component to the organoaluminum halide is within a range of 10:1 to 1:10, and more preferably within a range of about 2:1 to about 1:3 since a molar ratio within the latter range usually produces an especially active olefin polymerization catalyst.

In accordance with one embodiment of this invention, the first catalyst component resulting from the reaction of the dihalide, the transition metal compound, the silica-containing material and the organoaluminum halide is then reacted with a halide ion exchanging source comprising a halogen-containing compound of Groups IVA and VA.

The particularly preferred halide ion exchanging compounds of Groups IVA and VA are chlorine-containing compounds of Si, Ge, Sn, P, and C. Typical examples include $COCl_2$, $PCL_2$, $SiCl_4$, $SnCl_4$, $CCL_4$, and acid chlorides of the formula $R'COCl$ where $R'$ is an aliphatic or aromatic radical, preferably containing 1 to 20 carbon atoms.

Other halogen-containing compounds suitable in this embodiment include chlorosiloxanes of the formula $Si_nO_nCl_{2n+2}$ wherein n is a number in the range of 2 to 7, for example $Si_2OCl_6$; chlorinated polysilanes having the formula $Si_nCl_{2n+}$ where n is a number in the range of 2 to 6, such as $Si_4Cl_{10}$; chlorinated silanes having the formula $SiH_{431\ n}Cl_n$ wherein n is a number in the range of 1 to 3, such as $SiHCl_3$; silanes having the formula $R'SiH_xCl_y$ wherein $R'$ is an aromatic or aliphatic radical containing 1 to 20 carbon atoms, x a number in the range of 0 to 2, and y is a number in the range of 1 to 3, such as $C_2H_5SiCl_3$, $CH_3SiCl_2H$, and $(CH_3)_2SiCl_2$; alkoxy-halogensilanes of the formula $Si(OR)_{4-n}Cl_n$ wherein R is an alkyl or aryl radical having 1 to 20 carbon atoms and n is a number in the range of 1 to 3, such as $Si(OC_2H_5)Cl_3$.

In a particularly preferred embodiment, a chlorine-containing silicon compound or an organosilane is employed in combination with $TiCl_4$. Examples of the preferred silicon compounds for this embodiment include $SiCl_4$, $HSiCl_3$, $\phi SiHCl_2$ and $\phi SiCl_2$, wherein $\phi$ is a phenyl radical. In this embodiment, the ratio of silicon compound to $TiCl_4$ can vary considerably, generally however, best results are obtained if the molar ratio of silicon compound to $TiCl_4$ in the range of about 1/1.

Generally the reaction of the first catalyst component with the halogen containing source can be carried out neat or in a liquid medium in which the halide ion exchanging source is soluble. Accordingly, the first catalyst component is generally contacted with an inert liquid diluent in the process containing the halide ion exchanging source. Any suitable inert diluent can be employed. Examples include normally liquid hydrocarbon such as n-pentane, n-heptane, cyclohexane, benzene, and xylene.

The temperature employed in the reaction of the first catalyst component and halide ion exchanging source can be selected over a relatively broad range, generally in the range of $-25°$ C. to $+250°$ C., preferably $0°$ C. to $200°$ C., with a temperature of about $100°$ C. being most preferred.

The treating time can also be selected over a broad range and generally is within the range of about 10 minutes to about 10 hours. While the weight ratio of the halide ion exchanging source to the first catalyst component can be selected over a relatively broad range, the weight ratio oi the halide ion exchanging source to the first catalyst component is generally within a range of about 10:1 to about 1:10 and more generally from about 7:1 to about 1:4. Following the treatment of the first catalyst component with the halide ion exchanging source, the surplus halide ion exchanging source is removed by washing the solid catalyst with a dry (essential absence of water) liquid such as a hydrocarbon of the type previously discussed, n-hexane, or xylene for example. The resulting catalyst can be stored in the diluent, or after drying, stored under dry nitrogen.

While it may not be necessary in all instances to employ a cocatalyst with the catalyst of the present invention, the use of cocatalysts is recommended for best results. The organometallic cocatalysts suitable for use in accordance with the invention can be selected from among the hydrides and organometallic compounds of metals of Groups IA, II, and IIIA of the periodic Table. Of the organometallic cocatalysts, organoaluminum compounds are preferred with the most preferred organoaluminum cocatalysts being compounds of the formula $R_3Al$ which include, for example, trimethylaluminum, triethylaluminum, triisopropylaluminum, tridecylaluminum, triecosylaluminum, tricyclohexylaluminum, triphenylaluminum, 2-methylpentyldiethylaluminum, and triisoprenylaluminum. Triethylaluminia is preferred since this compound produced excellent results in the runs hereafter described.

The molar ratio of the organometallic compounds of the cocatalyst to the transition metal compound of the first catalyst component is not particularly critical and can be selected over a relatively broad range. Generally, the molar ratio of the organometallic compounds of the cocatalyst to the transition metal compound of the first catalyst component is within a range of about 1:1 to about 1500:1. For catalyst systems wherein the cocatalyst comprises at least one organoaluminum compound typically there is employed about 0.25 to 15 milligrams of the titanium-containing component per mmole of organoaluminum cocatalyst.

Generally it has also been found desirable to include a Lewis base when a triaalkyl aluminum is employed as the cocatalyst. Among Lewis bases capable of appropriate addition are amines, amides, ethers, esters, ketones, arsines, phosphoramides, thioethers, aldehydes, alcoholates, amides and salts of organic acids of metals of the first four groups of the Periodic Table. Preferred Lewis bases are an aromatic ester or an amine. Typical examples of aromatic esters are ethyl benzoate, ethyl p-methoxybenzoate (ethyl anisate), ethyl o-chlorobenzoate, ethyl naphthenate, ethyl toluate, and ethyl p-butoxybenzoate. A suitable amine is 2,2,6,6-tetramethylpiperidine. The preferred Lewis base:aluminum alkyl ratio is lower than 0.8:1, in the case of an aromatic ester or amine, the preferred ratio is from 0.1:1 to 0.6:1. The catalyst activity and stereospecifity seem to be related to the Lewis base:aluminum alkyl molar ratio.

A variety of polymerizable compounds are suitable for use in the process oi the present invention. Olefins which can be homopolymerized or copolymerized with the invention catalysts include aliphatic mono-olefins. While the invention would appear to be suitable for use with any aliphatic mono-1-olefin, those olefins having 2 to 20 carbon atoms are most often used. The mono-2-olefins can be polymerized according to the present invention employing either a particle form process, a gas phase process, or a solution form process. Aliphatic mono-1-olefins can be copolymerized with other 1-olefins and/or with other smaller amounts of other such as 1,3-butadiene, isoprene, 1,3-pentadiene, styrene, alpha-methylstyrene, and similar ethylenically unsaturated monomers which do not impair the catalyst.

Figure 5:
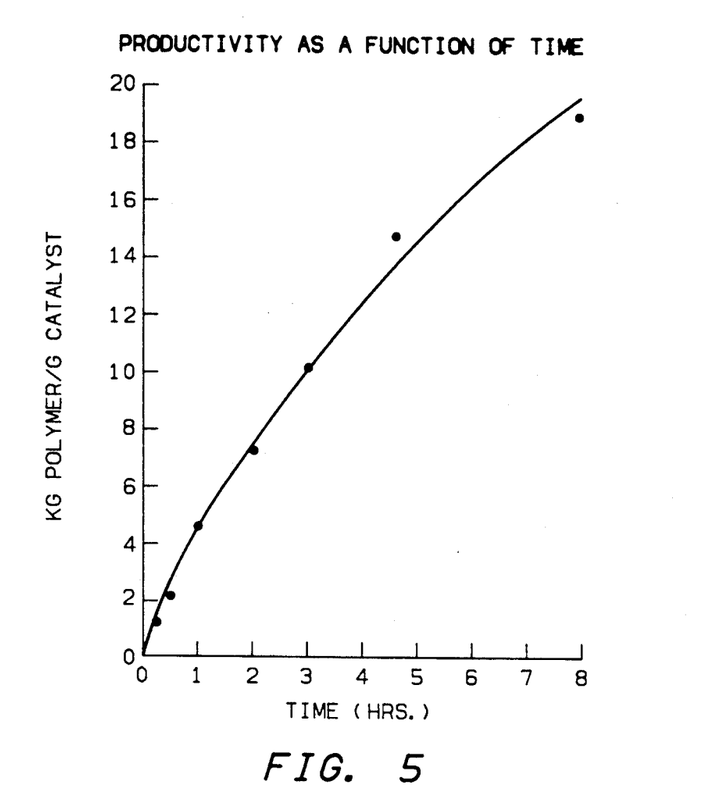
FIGS. 5 and 6 graphically depict the relationship of the increase in catalyst activity with time and the relationship between catalyst activity and catalyst crystal size.
Figure 6:
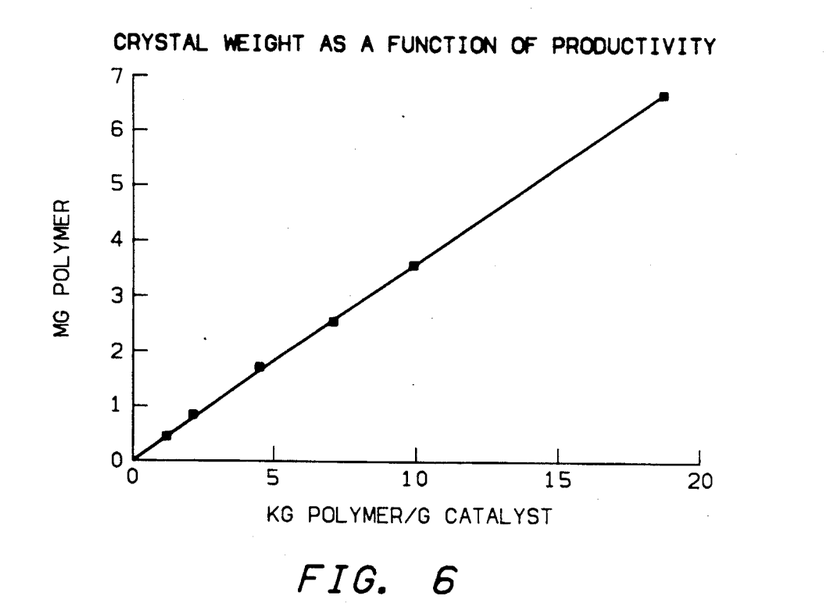

The catalysts of the invention are well suited for producing stereoregular polypropylene, offering potential for high rates as well as low soluble polymer formation. Moreover, catalyst activity remains constant for very long periods of time allowing productivities near 20 kg/g in 8 hours (FIG. 5). This catalyst system is also unusual in that as productivity increases, the size of the polymer particles increase (FIG. 6).

Polymerization may be conducted in a liquid phase, in liquid monomer in the presence or absence of an inert hydrocarbon diluent, or in a gas phase. In the polymerization of propylene, particularly satisfactory results have been attained operating in the presence of an aliphatic or aromatic hydrocarbon diluent, liquid under the polymerization conditions, such as propylene, toluene, gasoline, and the like.

The polymerization process according to the present invention employing the catalysts and cocatalysts as above described can be performed either batchwise or continuously. In a batch process, for example, a stirred autoclave is prepared by first purging with nitrogen and then with a suitable compound, such as isobutane for example. When the catalyst and cocatalyst are employed either can be adapted to the reactor first or they can be charged simultaneously through an entry port under an isobutane purge. After closing the entry port, hydrogen, if used, is added, and then a diluent such as isobutane is added to the reactor. The reactor is heated to the desired reaction temperature, which for polymerizing ethylene, for example, is, for best results, generally within a range of about 50° C. to about 102° C. and the monomer is then admitted and maintained at a partial pressure within a range of about 0.5 MPa to about 5.0 MPa (70-725 psig) for best results. At the end of the designated reaction period, the polymerization reaction is terminated and the unreacted olefin and isobutane are vented. The reactor is opened and the polymer, such as polyethylene, is collected as a free-flowing white solid and is dried to obtain the product.

In a continuous process, for example, a suitable reactor such as a loop reactor is continuously charged with suitable quantities of solvent or diluent, catalyst, cocatalyst, polymerizable compounds and hydrogen, if any, and in any desirable order. The reactor product is continuously withdrawn and the polymer recovered as appropriate, generally by flashing the diluent (solvent) and unreacted monomers and drying the resulting polymer.

For optimum productivity of polymer of low solubility in the continuous polymerization of propylene, it is preferable to contact the cocatalyst comprising the trialkylaluminum-Lewis Base with the titanium-containing catalyst for a short period immediately prior to its being exposed to liquid propylene. It is preferable under these circumstances that the molar ratio of trialkylaluminum to Lewis base in the cocatalyst be greater than 2:1, generally 3-4:1.

The olefin polymers made with the catalysts of this invention are useful in preparing articles by conventional polyolefin processing techniques such as injection molding, rotational molding, extrusion of film, and the like.

A further understanding of the present invention and its advantages will be provided by the following examples illustrating a few embodiments of the invention.

EXAMPLES

All catalysts were prepared in 1 qt. (0.95 L) glass, capped, beverage bottles in dry, air-free environments as described below.

A commercial, particulate, "anhydrous" $MgCl_2$ was the $MgCl_2$ source material, which analysis disclosed contained about 1.5 weight percent water. Magnesium chloride hydrates were generally prepared by slurrying 0.04 mol "anhydrous" $MgCl_2$ in 300 ml xylene, then adding 0.04 mol $H_2O$ and stirring the mixture at room temperature overnight (approximately 20 hours, 20-60 hours).

Generally, about 0.04 mole of the "hydrated" $MgCl_2$, about 0.02 mole of titanium titra-butoxide ($Ti(OBu)_4$,) 0.02 mole of phenol PH or H-phenyl phenol (4-PP) if employed, about 0.01 mole of ethyl benzoate (EB), if employed, and 300 mL of the xylene in a 1 qt. beverage bottle were heated for 1 hour at 100° C. in an oil bath while stirring the contents to obtain a solution. Heating was discontinued and the predominantly silica-containing material was added. The mixture was stirred to evenly distribute the particles and the resulting admixture was diluted to about 500 mL with additional xylenes (at a temperature of about 23° C). With continued stirring, 25 mL of ethylaluminum sesquichloride (EASC) as a 25 weight percent solution in n-heptane (0.02 mole EASC) was added dropwise. The product was isolated by centrifugation and washed several times by slurrying in n-hexane followed by centrifugation until the supernatant liquid was colorless. The washed material was then isolated by vacuum filtration and the cake allowed to dry in the glove box overnight.

Each resulting composition was activated for polymerization by heating a weighed portion thereof, generally 20 g unless specified otherwise, with 20-30 mL of a solution consisting of 50 volume percent $TiCl_4$ (55.6 weight percent), 37.5-40 volume percent $HSiCl_3$ (32.4-34.5 weight percent) and 10-12.5 volume percent $SiCl_4$ (9.6-12.0 weight percent), with stirring for 1 hour at 100° C. In one series, 5 g of the isolated, purified, dry composition was treated for 1 hour at 100° C. with 20 mL of a solution consisting of equal volumes of $TiCl_4$ and $SiCl_4$.

The activated compositions were recovered by filtration, washed with n-hexane to remove unreacted halides and dried as before to obtain the catalysts. Each catalyst was stored in a stoppered container in a dry, inert atmosphere such as argon or nitrogen until ready for testing. The resulting invention catalysts, the crystal shaped particles, were isolated along with the particulate silica material; the total mixture was added to the polymerization reactor.

Propylene polymerization was conducted in a 1 L stirred stainless steel reactor in liquid propylene for 1 hour at 70° C. in the presence of 10 psi hydrogen with a weighed portion oi the catalyst. Catalyst weights ranged from about 25 to about 100 mg. In each run, unless otherwise specified, a cocatalyst consisting of 2.0 mmoles of triethylaluminum (TEA) and 1.1 mmoles of ethyl anisate (EA), premixed, and 2.0 mmoles of diethylaluminum chloride (DEAC) were employed. The organometal solutions were each about 0.6 mole in n-heptane.

Following polymerization, the polypropylene was recovered, stabilized and dried.

Ethylene polymerizations was conducted in a 2 L stirred, stainless steel reactor containing 1.25 lbs. (567 g)

of isobutane diluent at the specified temperatures, times and in the presence of hydrogen, if used, to control polymer melt index. In each run unless otherwise specified, 1 mL of TEA (1 mmole TEA) as a solution in n-heptane, was used as cocatalyst. Total reactor pressure in each run was about 565 psia (3.89 MPa). Polymerization was terminated by discontinuing heating, venting gaseous reactants and recovering and drying the polyethylene produced.

The xylene and propylene solubles test was performed as follows. A gram sample of polymer was placed in a 100 ml centrifuge tube containing 100 ml of xylene or propylene. The tube was then placed in a Heater-Evaporator and maintained at 140° C. for 15 minutes while stirring occasionally. After the 15 minute heating was completed, the tube was removed from the heater and allowed to cool at room temperature for 15 minutes, following by cooling in an ice bath for 30 minutes. The tube was then placed in an International Model V Centrifuge and centrifuged at approximately 1900 rpm for 15 minutes. The tube was removed from the centrifuge and 25 ml of the supernatant liquid was removed to an aluminum dish which had been previously weighted while empty. The dish containing the liquid was heated for 30 minutes, then was allowed to cool, and subsequently was reweighed.

The weight percent solubles was calculated according to the equation:

$$\% \text{ solubles} = \frac{4A \times 100}{S}, \text{ where}$$

A = grams of polymer in aluminum dish, and
S = grams of original polymer sample.

EXAMPLE I

A series of catalysts was prepared in a multi-step process comprising: (1) stirring a mixture consisting of 0.04 mole particulate $MgCl_2.0.008\ H_2O$, 0.04 mole $H_2O$ and 300 mL mixed xylenes (hereafter called xylene) for about 3 days at 23° C., (2) admixing (1) with 0.02 mole $Ti(OBu)_4$ and 0.02 mole phenol and heating the stirred mixture at 100° C. for 1 hour to obtain a solution, (3) adding with stirring the silicas employed and diluting the resulting mixture to about 500 mL with room temperature (about 23° C.) xylene, (4) reacting (3) with 0.0% mole EASC as a 25 weight percent solution in n-heptane to form catalyst precursor A which is isolated by centrifugation, washed with n-hexane and dried, as described before.

Each catalyst precursor A composition weighing 20 g was activated for polymerization by treatment with 20–30 mL of a 3-component halide mixture consisting of 50 volume percent $TiCl_4$, 37.5 volume percent $HSiCl_3$ and 12.5 volume percent $SiCl_4$ at 100° C. for 1 hour. The corresponding weight ratio of halides to initial $MgCl_2$ ranged from about 8:1 to about 10:1. The resulting compositions were isolated by suction filtration, then washed with n-hexane and dried to obtain the catalysts.

The color of the dried precursor compositions A ranged from yellow to orange. The colors of the dried catalysts obtained were generally orange to reddish-brown. The silicas employed were conditioned for use in the catalyst preparations by calcining each in dry air under fluidizing conditions at the specified temperature for 3 hours. The conditioned supports were flushed with nitrogen, cooled, then recovered and stored under nitrogen. The silica used was Davison Chemical Company grade 952.

The weights of the silica employed and the catalyst precursor and the activated catalyst were all measured. The weight of the active catalyst component (other than the silica) was then calculated for each catalyst, based on the ratio of silica in precursor to silica in activated catalyst. The weights of silica employed, precursor made, catalyst produced, calculated percentages, etc. are presented in Table 1A.

TABLE 1A

| | Precursors and Isolated Catalysts Thereof | | | | | | |
|---|---|---|---|---|---|---|---|
| | Silica | | Precursor | Isolated Catalyst[a] | | | |
| Catalyst | | Calcining | | Total[b] | Wt.[c] | Calc. Wt. %[d] | |
| No. | Wt. g | Temp. °C. | Wt. g | Wt. g | Calc., g | Silica | Active Catalyst |
| 1 | 20.8 | 150 | 30.2 | 19.3 | 13.8 | 71.5 | 28.5 |
| 2 | 23.2 | 200 | 33.3 | 19.1 | 14.0 | 73.3 | 26.7 |
| 3 | 22.2 | 500 | 32.7 | 19.0 | 13.6 | 71.6 | 28.4 |
| 4 | 26.5 | 700 | 34.1 | 18.6 | 15.5 | 83.3 | 16.7 |
| 5 | 22.8 | 800 | 32.9 | 18.1 | 13.8 | 76.2 | 23.8 |
| 6 | 27.2 | 900 | 35.2 | 18.7 | 15.5 | 82.9 | 17.1 |

[a]Catalyst prepared from 20 g of corresponding precursor and activated with the previously described $TiCl_4$—H-$SiCl_3$—$SiCl_4$ mixture.
[b]Silica + active catalyst component.
[c]Calculated weight of the silica in the final catalyst was obtained by multiplying the percentage of silica in the catalyst precursor by the 20 g of precursor used.
[d]Calculated weight percentages for the silica in the final catalyst was obtained by dividing the calculated weight of the silica in the final catalyst by the measured total weight of the final catalyst, then multiplying by 100. The weight precentage for the active catalyst was then calculated as the remaining percentage.

A portion of each catalyst in Table 1A was tested for propylene polymerization under the conditions previously described. The results are set forth in Table 1B.

TABLE 1B

| | Propylene Polymerization | | | | | | | | | |
|---|---|---|---|---|---|---|---|---|---|---|
| | Weight, mg | | Calc. Activity kg/g/hr[a] | | Wt. % Solubles[b] | | Melt Flow[c] | Density[d], g/cc | | Flex Mod.[e] |
| Cat. No. | Total Cat. | Active Cat. | Total Cat. | Active Cat. | Propylene | Xylene | g/10 min. | Molded | Bulk | MPa |
| 1 | 39.9 | 11.4 | 1.44 | 5.04 | 3.1 | 3.7 | 6.0 | 0.9075 | 0.378 | 1509 |
| 2 | 66.8 | 17.8 | 1.76 | 6.59 | 1.8 | 4.5 | 4.4 | 0.9055 | 0.381 | 1392 |
| 3 | 64.2 | 18.2 | 1.84 | 6.39 | 1.3 | 3.9 | 4.0 | 0.9063 | 0.413 | 1398 |
| 4 | 57.0 | 9.52 | 1.08 | 6.45 | 2.4 | 3.7 | 5.2 | 0.9067 | ~0.44 | 1567 |

TABLE 1B-continued

| | Propylene Polymerization | | | | | | | | | |
|---|---|---|---|---|---|---|---|---|---|---|
| | Weight, mg | | Calc. Activity kg/g/hr[a] | | Wt. % Solubles[b] | | Melt Flow[c] | Density[d], g/cc | | Flex Mod.[e] |
| Cat. No. | Total Cat. | Active Cat. | Total Cat. | Active Cat. | Propylene | Xylene | g/10 min. | Molded | Bulk | MPa |
| 5 | 60.8 | 14.5 | 1.87 | 7.83 | 1.3 | 3.8 | 3.4 | 0.9058 | 0.452 | 1411 |
| 6 | 56.1 | 9.59 | 0.822 | 4.81 | 3.1 | 2.8 | 3.8 | 0.9074 | ~0.44 | 1396 |

[a]Calculated activity is based on polymer recovered from the reactor but does not include propylene soluble polymer. It is in terms of kilograms polypropylene per g solid catalyst per hour
[b]Solubles test described herein.
[c]ASTM D 1238, condition L
[d]ASTM D 1505

The results in Table 1B show that the suPported catalysts are all active in propylene polymerization under the conditions employed and that the polymers made with them are in the commercially useful range based on the melt flows ranging from about 3 to 6, with molded densities in the 0.906 to 0.907 g/cc range and flexural modulus values ranging from about 1400 to about 1560 MPa. The catalysts are all effective in suppressing propylene-soluble and xylene-soluble polymer levels based on the values shown. In considering the contribution made by the active catalyst only (neglecting the silica weight), calculated results show productivities ranging from about 4.8 to 7.8 kg polypropylene per g active catalyst per hour at 70° C.

Figure 2A:
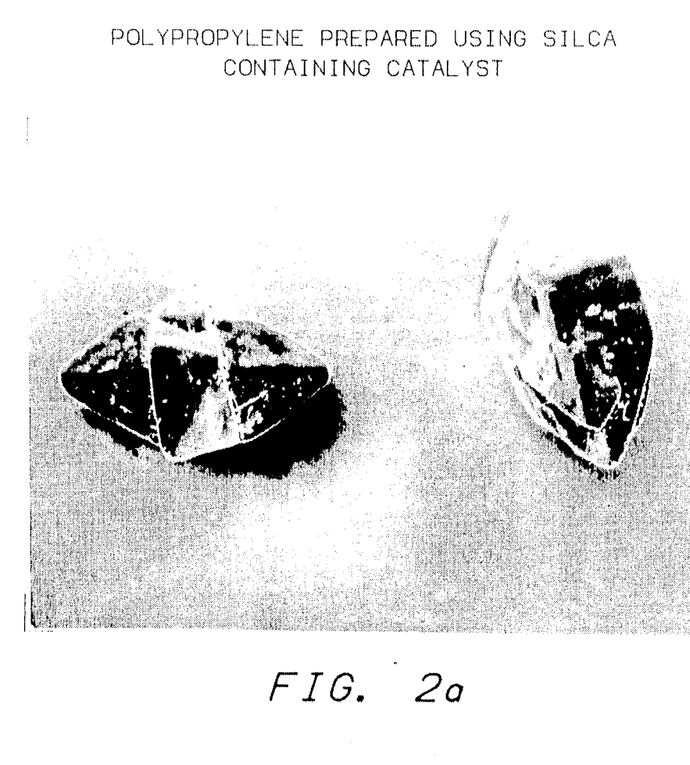
FIGS. 2 and 4 are SEM photographs of the crystal-like appearing polymers produced through the employment of the invention catalysts.

The recovered polymers were all in the form of granules, generally containing some crystal-like appearing particles, see FIG. 2A, which depicts a SEM photograph of the polymer produced with catalyst 5. The bulk density of the nascent polymer increased from about 0.38 g/cc with catalyst 1, prepared in the presence oi silica which had been calcined at 150° C., to about 0.45 g/cc with catalysts 4, 5, 6, prepared in the presence of silica which had been calcined at 700°, 800°, and 900° C., respectively. Individual crystal shaped polymer particles had densities of 0.88 g/cc, about 97% of the density of the molded material. When good catalyst activity and high bulk density of as nascent polymer are both desired, the overall results obtained with catalysts 4, 5 suggest that the optimum silica calcining temperature is in the 700°-800° C. with the catalyst system of the invention.

EXAMPLE II

A series of catalysts was prepared from 5 g portions of the precursor A compositions used in producing catalysts 1, 2, 3, 5 of Example I by contacting each precursor portion with about 20 mL of a halide mixture consisting of equal volumes of TiCl4 and SiCl4 at 100° C. for 1 hour. The corresponding weight ratio of halides to initial MgCl2 was about 6:1 The resulting compositions were purified and recovered as before to obtain the orange-colored catalysts.

The weights of catalysts produced, the calculated weight of silica contained in each catalysts, and calculated weight percent of silica and active catalyst of each catalyst are given in Table 2A.

TABLE 2A

| | Silica-Containing Catalysts | | | |
|---|---|---|---|---|
| Catalyst No. | Wt. g | Wt. Silica Calc., g[a] | Calculated Weight Percent | |
| | | | Silica[b] | Active Catalyst |
| 7 | 4.7 | 3.45 | 73.4 | 26.6 |
| 8 | 4.7 | 3.5 | 74.5 | 25.5 |
| 9 | 4.5 | 3.4 | 75.6 | 24.4 |
| 10 | 4.4 | 3.5 | 79.5 | 20.5 |

[a]See footnote (c) in Table 1A.
[b]See footnote (d) in Table 1A.

A portion of each catalyst in Table 2A was tested in propylene polymerization under the conditions previously described. The results are given in Table 2B.

TABLE 2B

| | Propylene Polymerization | | | | | | | | | |
|---|---|---|---|---|---|---|---|---|---|---|
| | Weight, mg | | Calc. Activity kg/g/hr[a] | | Wt. % Solubles[b] | | Melt Flow[c] | Density[d], g/cc | | Flex Mod.[e] |
| Cat. No. | Total Cat. | Active Cat. | Total Cat. | Active Cat. | Propylene | Xylene | g/10 min. | Molded | Bulk | MPa |
| 7 | 51.6 | 13.7 | 1.81 | 6.83 | 2.0 | 3.3 | 7.4 | 0.9077 | 0.306 | 1479 |
| 8 | 54.7 | 13.9 | 1.46 | 5.76 | 2.9 | 3.7 | 5.4 | 0.9073 | 0.352 | 1467 |
| 9 | 54.6 | 13.3 | 1.18 | 4.83 | 2.3 | 3.9 | 6.0 | 0.9076 | 0.404 | 1506 |
| 10 | 55.5 | 11.4 | 1.12 | 5.43 | 3.1 | 4.2 | 4.9 | 0.9074 | 0.420 | 1396 |

[a]Calculated activity is based on polymer recovered from the reactor but does not include propylene soluble polymer. It is in terms of kilograms polypropylene per g solid catalyst per hour.
[b]Solubles test described herein.
[c]ASTM D 1238, condition L
[d]ASTM D 1505
[e]ASTM D 790

The TiCl4-SiCl4 mixture was used in Example II to activate a portion of the precursor A compositions whereas in Example I, the corresponding precursor A compositions were activated with the TiCl4-HSiCl3-SiCl4 mixture.

The polymerization results in Table 2B indicate that catalyst activity declines somewhat as the calcining temperature of the silica increases from 150° to 800° C. The results shown in Table 1B are just the reverse. The soluble levels, flexural modulus results, molded density results and melt :low values are approximately the same suggesting that similar polymers are made with each activated catalyst regardless of the activating halide mixture employed. However, the bulk density results, compared with those in Table 1B, suggest that polymers made with catalyst activated with the 2-component halide mixture may have slightly lower bulk densities. The nascent polymer was in the form of granules containing crystal-like particles obtained with catalyst 7 to mostly crystal-like particles obtained with catalyst 10. Generally, as the amount of crystal-like particles increased, the bulk density of the polymer also increased.

EXAMPLE III

A series of 5 catalyst precursors and comparison catalysts therefrom was produced as described in Example I. In this series, the precursor compositions were formed in the presence of alumina, or a modified silica, or a modified alumina-silica.

Catalyst 11 was prepared in the presence of grade 952 silica, modified as follows: 10 mL of the silica was fluidized in nitrogen at 800° C. and treated over about 30 minutes by slowly injecting 4.0 mL of toluene into the fluidizing gas. Heating in nitrogen at 800° C. was continued for 1½ hours. As before, the product, which was black in color due to carbon formed from the toluene, was cooled and stored under nitrogen.

Catalyst 12 was prepared in the presence of grade 952 silica, modified by pretreatment with methanol at 300° C. In this instance, 100 mL of the silica was fluidized in dry air at 300° C., flushed with nitrogen and treated by slow injection of 5.0 mL of methanol over about 30 minutes. Heating was continued another 30 minutes in nitrogen and the support was cooled and recovered in the presence of nitrogen. A volume ratio of silica:methanol of 20:1 was used.

Catalyst 13 was prepared in the presence of grade 952 silica modified by pretreatment with carbon monoxide at 900° C. A 100 mL sample of the silica was fluidized in dry air at 900° C. for about 30 minutes, then flushed with nitrogen, then fluidized at 900° C. for 1 hour with carbon monoxide The carbon monoxide was replaced with $N_2$ and the support was cooled and stored in its presence.

Catalyst 14 was prepared in the presence of Davison Chemical Co. grade SRS 11 (93.4 wt. $Al_2O_3$ and 6.6 wt. % $SiO_2$) modified by phosphating. A 30 g sample of the support was slurried in 1 liter of water containing 3.8 mL of 85% $H_3PO_4$ for about 15 hours. The product was washed once with water, once with isopropanol, dried in a vacuum oven at m 80° C. and then fluidized in dry air at 600° C. for 3 hours. The air was replaced with $N_2$ and the product was cooled and stored under $N_2$ as before. The calculated atom ratio of P/Al was about 0.1:1.

Catalyst 15 was prepared in the presence of Davison Chemical Co. grade SRA alumina spheres, previously heated under fluidizing conditions in dry air for 3 hours at 200° C. The air was replaced with $N_2$ and the support was cooled and stored in its presence. The weights of catalyst precursor A, catalyst produced therefrom and calculated quantities as noted before are presented in Table 3A.

TABLE 3A

| | Solid Material | | Precursor | | Isolated Catalyst[a] | | |
|---|---|---|---|---|---|---|---|
| | | | | | Wt. Solid[b] | Calc. Wt. %[c] | |
| No. | Wt. g | Type | Wt. g | Wt. g | Calc., g | Support | Catalyst |
| 11 | 16.05 | modified $SiO_2$ | 24.7 | 9.3 | 5.5 | 59.1 | 40.9 |
| 12 | 20.0 | modified $SiO_2$ | 29.9 | 18.5 | 13.4 | 72.4 | 27.6 |
| 13 | 20.0 | modified $SiO_2$ | 29.0 | 17.4 | 13.8 | 79.3 | 20.7 |
| 14 | 16.1 | modified $Al_2O_3$—$SiO_2$ | 25.1 | 19.6 | 12.8 | 65.3 | 34.7 |
| 15 | 17.2 | $Al_2O_3$ | 26.7 | 18.8 | 12.9 | 68.6 | 31.4 |

[a]Catalyst prepared from 20 g (and for run No. 11 only, 10 g) of corresponding precursor and activated with the previously described $TiCl_4$—$HSiCl_3$—$SiCl_4$ mixture.
[b]See footnote (c) in Table 1A.
[c]See footnote (d) in Table 1A.

Catalyst 12-5 were activated by contact of 20 g of precursor with 20-30 mL of the 3-component halide mixture at 100° C. as described in Example I. Catalyst 11 was activated hy contact of 10 g of its precursor with about 10 mL of the 3-component halide mixture at 100° C. for 1 hour.

A portion of each catalyst in Table 3A was tested in propylene polymerization under the conditions previously described. The results are presented in Table 3B.

TABLE 3B

| | | | Propylene Polymerization | | | | | | | |
|---|---|---|---|---|---|---|---|---|---|---|
| | Weight, mg | | Calc. Activity kg/g/hr[a] | | Wt. % Solubles[b] | | Melt Flow[c] | Density[d], g/cc | | Mod.[e] |
| Cat. No. | Total Cat. | Active Cat. | Total Cat. | Active Cat. | Propylene | Xylene | g/10 min. | Molded | Bulk | MPa |
| 11 | 20.4 | 8.34 | 2.06 | 5.04 | 3.3 | 3.5 | 7.9 | 0.9069 | 0.317 | 1520 |
| 12 | 59.71 | 16.5 | 1.74 | 6.30 | 2.9 | 4.4 | 6.1 | 0.9038 | 0.332 | 1208 |
| 13 | 56.6 | 11.7 | 1.08 | 5.25 | 2.9 | 6.8 | 7.1 | 0.9062 | 0.261 | 1374 |
| 14 | 56.2 | 19.5 | 1.60 | 4.61 | 3.3 | 7.5 | 6.9 | 0.9040 | (f) | 1214 |
| 15 | 72.3 | 22.7 | 0.844 | 2.69 | 3.8 | 5.5 | 8.2 | 0.9060 | 0.195 | 1237 |

[a]Calculated activity is based on polymer recovered from the reactor but does not include propylene soluble polymer. It is in terms of kilograms polypropylene per g solid catalyst per hour.
[b]Solubles test described herein.
[c]ASTM D 1238, condition L
[d]ASTM D 1505
[e]ASTM D 790
[f]A dash signified no determination was made.

The results in Table 3B show that active propylene polymerization catalysts are made containing the alumina employed in catalyst 15, the phosphated alumina-silica used in catalyst 14 and the modified silica employed in catalysts 11-13. However, none of the catalysts produced crystal-like polymer particles as did invention catalysts 1-10. Catalyst 11, made with silica containing carbon, produced a light, gray-colored fluff having a bulk density of about 0.32 g/cc. Catalyst 12 made with methanol-treated silica produced polymer granules having a bulk density of about 0.33 and a relatively low flexural modulus value of 1208 MPa, the lowest value of the polypropylene samples made in the Examples. Catalyst 13, made with carbon monoxide-treated silica, produced polymer granules having a bulk density of only about 0.26 g/cc and an increased xylene-soluble level of 6.8 weight percent. Catalyst 14, made with phosphated alumina-silica, produced relatively $H_3PO_4$ rather than 3.8 mL. The calculated atom ratio of P/Al remains about 0.1:1, however.

Catalyst 19 was prepared in the presence of grade SRA alumina beads, calcined in dry air for 3 hours at 200° C. as described for Catalyst 15.

The weights of catalyst precursor A made, catalyst produced therefrom and calculated quantities as noted before are set forth in Table 4A.

TABLE 4A

| | Catalyst Solid | | Precursor | Total | Isolated Catalyst[a] | | |
|---|---|---|---|---|---|---|---|
| | | | | | Wt. Solid[b] | Calc. Wt. %[c] | |
| No. | Wt. g | Type | Wt. g | Wt. g | Calc., g | Solid | Active Catalyst |
| 16 | 20 | Modified $SiO_2$ | 27.6 | 18.9 | 14.7 | 77.8 | 22.2 |
| 17 | 20 | Modified $SiO_2$ | 26.6 | 18.6 | 15.0 | 80.6 | 19.4 |
| 18 | 20 | Modified $Al_2O_3$—$SiO_2$ | 30.8 | 20.3 | 13.0 | 64.0 | 36.0 |
| 19 | 20 | $Al_2O_3$ | 29.2 | 19.2 | 13.7 | 71.4 | 28.6 |

[a]Produced with 20 g of the corresponding precursor and activated with 20–30 mL of the 3-component halide mixture at 100° C. as described in Example I.
[b]See footnote (c) in Table 1A.
[c]See footnote (d) in Table 1A.

large but light solid spheres (bulk density not determined) and a relatively high xylene-soluble level of 7.5 weight percent, the highest value of any of the polypropylene samples made in the Examples. Catalyst 15, made with alumina calcined at 200° C., produced a light fluffy polymer having a bulk density of only about 0.2 g/cc, the lightest bulk density polypropylene produced in the Examples.

EXAMPLE IV

A series of 4 catalyst precursors and comparison catalysts therefrom was produced in the manner described in Example III except that 0.01 mole of 4-phenylphenol was substituted for the phenol.

Catalyst 16 was prepared in the presence of grade 952 silica pretreated with methanol in the manner employed in catalyst 12 except that a volume ratio of silica:methanol of 10:1 was used.

Catalyst 17 was prepared in the presence of grade 952 silica modified by pretreatment with $CCl_4$ at 600° C. in nitrogen. A 100 mL sample of the silica was fluidized in dry air at 600° C. for 1 hour. The air was replaced with nitrogen, then the nitrogen was bubbled through $CCl_4$ and passed into the fluidized bed for 1 hour at 600° C. The bed was flushed with nitrogen alone and the support was cooled and stored in its presence.

Catalyst 18 was prepared in the presence of grade SRS II as in the manner described for catalyst 14 except that the phosphating was accomplished with 4.1 mL of A portion of each catalyst in Table 4A was tested in propylene polymerization under the conditions previously described. The results are given in Table 4B.

TABLE 4B

| | | | | Propylene Polymerization | | | | | |
|---|---|---|---|---|---|---|---|---|---|
| | Weight, mg | | Calc. Activity kg/g/hr[a] | | | | | | |
| Cat. No. | Supported Total | Calc. Active Cat. | Total Cat. | Calc. Active Cat. | Wt. % Solubles[b] Propylene | Xylene | Melt Flow[c] g/10 min. | Density[d], g/cc Molded Bulk | | Flex Mod.[e] MPa |
| 16 | 117.4 | 26.1 | 0.702 | 3.16 | 2.4 | 3.2 | 10 | 0.9063 | [f] | 1368 |
| 17 | 55.0 | 10.7 | 1.91 | 9.81 | 1.7 | 3.6 | 3.9 | 0.9077 | 0.205 | 1426 |
| 18 | 39.5 | 14.2 | 0.603 | 1.68 | 6.1 | 3.4 | — | — | — | — |
| 19 | 60.6 | 17.3 | 0.500 | 1.75 | 5.2 | 6.5 | 6.3 | 0.9065 | — | 1320 |

[a]Calculated activity is based on polymer recovered from the reactor but does not include propylene soluble polymer. It is in terms of kilograms polypropylene per g solid catalyst per hour.
[b]Solubles test described herein.
[c]ASTM D 1238, condition L
[d]ASTM D 1505
[e]ASTM D 790
[f]A dash signifies no determination was made.

Catalysts 16, 18, 19 of Table 4B differ primarily from the corresponding catalysts 12, 14, 15 of Table 3B in the type of phenol employed in their production. Table 3B catalysts were made with 0.02 mole phenol whereas those in Table 4B were made with 0.02 mole 4-phenylphenol. The polymer activity results obtained with each set of catalysts suggest that the catalysts of Table 4B are less active than the corresponding set of Table 3B catalysts since lower activity values are listed, e.g. 0.72 kg/g solid cat.hr for catalysts 16 of Table 4B vs. 1.79 kg/g solid cat.hr for catalyst 12 of Table 3B. However, the catalysts of Table 4B are generally more selective than those of Table 3B, except for catalyst 19, since less xylene-soluble polymer is produced, e.g. 3.2 wt. % for catalysts 16 vs. 4.4. wt. % for catalyst 12. Generally, both sets of catalysts produced similar nascent polymer.

Catalyst 17 of Table 4B, prepared in the presence of chlorinated silica, was the most active and selective catalysts of this series. The support catalysts produced about 1.9 kg polypropylene per g catalyst per hour, only 1.7 wt. % propylene-soluble polymer and 3.6 wt. % xylene-soluble polymer. The calculated active portion of the supported catalyst, e.g. minus the support, has a calculated activity of about 9.8 kg polypropylene per g catalyst per hour. However, the catalyst produced fluffy nascent polymer having a bulk density of about 0.2 g/cc.

EXAMPLE V

A variation in catalyst preparation was employed in the production of this catalysts designated catalyst 20 A mixture of 0.02 mole of Ti(OBu)$_4$, 0.02 mole of 4-PP, 0.04 mole of H$_2$O and 300 mL of xylene was stirred for ½ hour, then 0.04 mole of the "anhydrous" MgCl$_2$ described in Example I was added. The stirred mixture was heated for 0.75 hour at 100° C., then 0.01 mole of ethyl benzoate was added and the resulting mixture was heated for ¼ hour at 100° C. Then 26.0 g of grade 952 silica, previously calcined in air for 3 hours at 800° C., was added. The reaction mixture, after stirring 10 minutes, was diluted up to 500 mL with xylene, reacted with EASC and recovered as before to yield 35.9 g of a red-brown solid as precursor A. A 20 g sample of the precursor was activated with the 3-component halide mixture at 100° C. then washed and dried, all as before, to yield 20.95 g of a purple solid as the catalyst.

The isolated supported dry catalyst was calculated to contain 14.5 g of the support corresponding to 69.1 weight percent silica and 30.9 weight percent active catalyst.

A 56.7 mg portion of the supported catalysts, corresponding to a calculated 17.5 mg of active catalyst, was employed in propylene polymerization under the conditions detailed before. Calculated activities of 0.61 kg polypropylene per g catalyst per hour for the supported catalyst corresponding to 5.22 kg polypropylene per g catalyst per hour for the active catalyst alone were obtained in the run. It was ascertained that 2.2 weight percent propylene solubles and 3.0 weight percent xylene solubles were made.

The polymer was found to have a melt flow of 8.7 g/10 min., a molded density of 0.9074 g/cc and a flexural modulus of 1548 MPa. These values are all in the range previously shown. The polymer, however, was in the form of a light, granular fluff, exhibiting a very low bulk density of 14.7 lbs./ft.$^3$ (0.156 g/cc).

EXAMPLE VI

A series of 3 catalyst precursors containing crystalline silicas (silicalites) and 5 comparison catalysts containing various zeolite type materials (obtained from Linde Chemical Co.) were produced in the manner described in Example III, except that 5 gram samples were activated in the three component halide mixture.

Invention catalyst 21 was prepared in the presence of a commercially obtained silicalite. Comparison catalyst 22 was prepared in the presence of an (NH$_4$) Y zeolite; comparison catalyst 23 was prepared in the presence of a mordenite; comparison catalyst 24 was prepared in the presence of a (K) L zeolite; comparison catalyst 25 was prepared in the presence of an erionite; invention catalyst 26 was prepared in the presence of a silicalite (also obtained from Linde); and comparison catalyst 28 was prepared in the presence of a zeolite designated ELZ-Ω-6 (from Linde).

Invention catalysts 27 was prepared in the presence of a dealuminated faujasite. A sample of faujasite was heated at 840° C. in air for 4 hours, then was slurried in a 3 molar solution of HCl, then was dried at 140° C. in order to prepare the dealuminated fajuasite.

The weight of catalysts precursor made, catalyst produced therefrom and calculated quantities as noted before are set forth in Table 5A.

TABLE 5A

| | Catalyst Solid | | Precursor | Total | Wt. Solid$^{(a)}$ | Isolated Catalyst Calc. Wt. %$^{(b)}$ | |
|---|---|---|---|---|---|---|---|
| No | Wt. % | Type | Wt. g | Wt. g | Calc., g | Solid | Active Catalyst |
| 21 | 20.0 | Silicalite | 25.6 | 4.6 | 3.91 | 84.9 | 15.1 |
| 22 | 20 | (NH$_4$)$_4$ Zeolite | 22.4 | 6.2 | 4.47 | 72.1 | 27.9 |
| 23 | 20 | Mordenite | 25.6 | 5.1 | 3.91 | 76.6 | 23.4 |
| 24 | 20 | (K) L Zeolite | 29.7 | 5.4 | 3.37 | 62.5 | 37.5 |
| 25 | 20 | Erionite | 26.4 | 5.3 | 3.79 | 63.8 | 36.2 |
| 26 | 20 | Silicalite | 27.8 | 4.1 | 3.60 | 88.5 | 11.5 |
| 27 | 20 | Dealuminated | 29.4 | 4.3 | 3.40 | 78.9 | 21.1 |
| 28 | 20 | ELZ-Ω-6 | 29.4 | 4.5 | 3.40 | 75.6 | 24.4 |

$^{(a)}$See footnote (c) in Table 1A.
$^{(b)}$See footnote (d) in Table 1A.

A portion of each catalyst in Table 5A was tested in propylene polymerization under the conditions previously described in Example I. The results are given in Table 5B.

TABLE 5B

| | Propylene Polymerization | | | | | | | | |
|---|---|---|---|---|---|---|---|---|---|
| | Weight, mg | | Calc. Activity, kg/g/hr$^{(a)}$ | | | Melt | Density$^{(d)}$, g/cc | | Flex |
| Cat. No. | Supported Total | Calc. Active Cat. | Total Cat. | Calc. Active Cat. | Wt. % Solubles$^{(b)}$ | | Flow$^{(c)}$ g/10 min. | | Mod.$^{(e)}$ MPa |
| | | | | | Propylene | Xylene | | Molded | Bulk | |
| 21 | 32.4 | 4.89 | 0.861 | 5.69 | 3.29 | 3.29 | —$^{(f)}$ | — | — | — |
| 22 | 40.6 | 11.33 | 0.079 | 0.237 | 15.6 | — | — | — | — | — |
| 23 | 61.9 | 14.48 | 0.273 | 1.12 | 4.08 | — | — | — | — | — |
| 24 | 89.7 | 36.64 | 0.011 | 0.018 | 39.0 | — | — | — | — | — |
| 25 | 116.3 | 42.10 | .186 | 0.494 | 3.75 | — | — | — | — | 1487 |
| 26 | 89.5 | 10.29 | 2.12 | 18.3 | .29 | 4.71 | 3.3 | — | — | 1528 |
| 27 | 83.9 | 17.70 | .579 | 2.67 | 2.59 | 4.55 | 6.8 | — | — | — |

TABLE 5B-continued

Propylene Polymerization

| Cat. No. | Weight, mg | | Calc. Activity, kg/g/hr[a] | | Wt. % Solubles[b] | | Melt Flow[c] g/10 min. | Density[d], g/cc | | Flex Mod.[e] MPa |
|---|---|---|---|---|---|---|---|---|---|---|
| | Supported Total | Calc. Active Cat. | Total Cat. | Calc. Active Cat. | Propylene | Xylene | | Molded | Bulk | |
| 28 | 29.0 | 7.08 | .234 | 0.873 | 9.12 | — | — | — | — | — |

[a]Calculated activity is based on polymer recovered from the reactor but does not include propylene soluble polymer. It is in terms of kilograms polypropylene per g solid catalyst per hour.
[b]Solubles test described herein.
[c]ASTM D 1238, condition L
[d]ASTM D 1505
[e]ASTM D 790
[f]A dash signifies no determination was made.

The polymer results in Table 5B indicate that catalyst activity was higher for the silicalites, catalysts 21 and 26. The catalyst prepared from the dealuminated faujasite (catalyst 27) exhibited slightly lower activity. The remaining zeolite supported catalysts exhibited poor activity overall. The amount of solubles was also lower for the catalysts prepared with on the predominantly silica-containing materials.

The flexural modulus for the polymers produced with the silica containing catalysts compares well with the previous invention runs, see Table 1B.

Figure 2B:
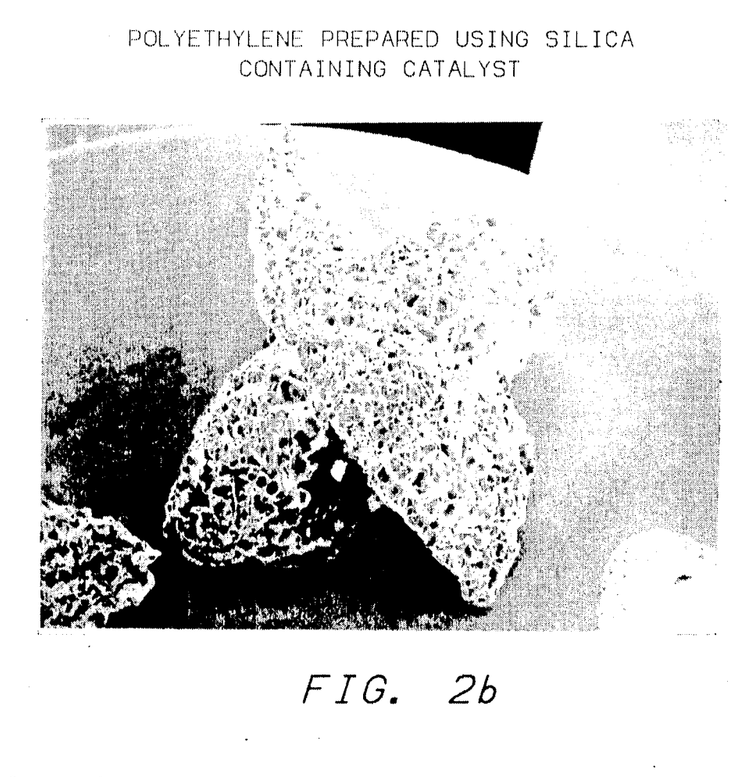
Figure 4:
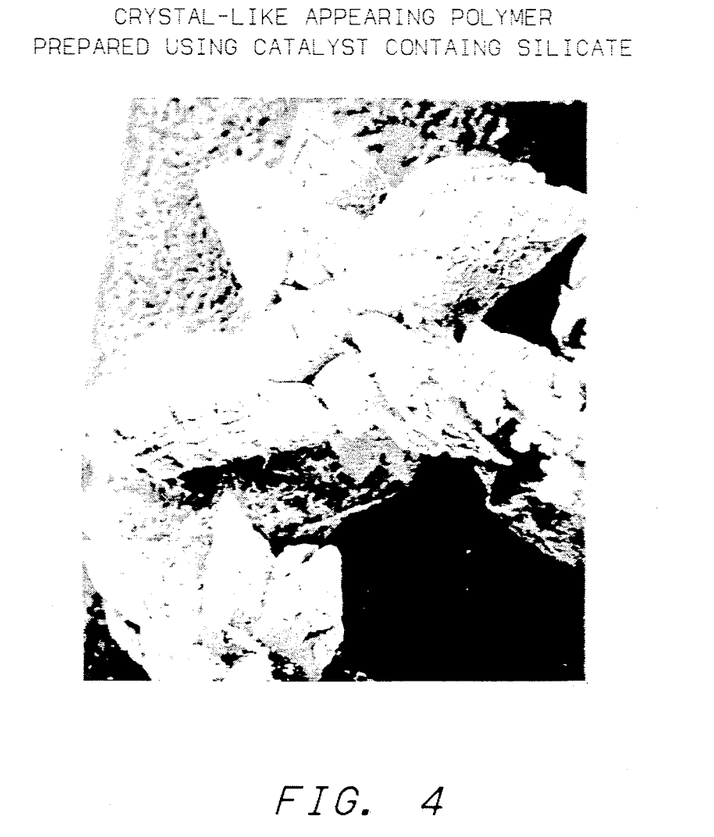

As can be seen from FIG. 4, the polymer produced with the silicalite supported catalyst appears crystal-like, although the crystals are not as well defined as those of the polymer in FIG. 2 which was produced with a silica containing catalyst.

EXAMPLE VII

Propylene polymerization runs were conducted with individual portions of previous catalyst precursors, catalyst 5 precursor, catalyst 21 precursor, and catalyst 26 precursor, all using a cocatalyst mixture of 2 moles TEA, 2 moles DEAC and 1 mole of 2,2,6,6-tetramethylpiperadine (TMP, obtained from Fluka AG of Switzerland. Polymerization was conducted in the 2 L reactor containing 1.25 lbs. of isobutane at a total reactor pressure of 565 psia. The pressure was maintained during a run from the addition of ethylene, as needed, from a pressurized reservoir. Hydrogen was employed in all but one run for melt index control.

The reactor temperatures employed, actual run times used, hydrogen pressure employed, productivity calculated for the actual run time and normalized to 60 minutes, when necessary, are given in Table 6. Also included is calculated productivity per 60 minutes based on active catalyst contained in the supported catalyst.

TABLE 6

| Run No. | Cat. No. | Cat. Weight, mg | | Reactor Temp °C. | H₂ Psi | Calc. Activity Kg/g/hr. | | Wt. % Solubles | |
|---|---|---|---|---|---|---|---|---|---|
| | | Total Cat. | Calc. Active Cat. | | | Total Cat. | Calc. Active Cat. | Propylene | Xylene |
| 1 | 5 | 6.2 | 1.48 | 70° C. | 40 | .970 | 4.06 | — | — |
| 2 | 5 | 133.3 | 31.73 | 80° C. | 40 | 1.88 | 7.90 | — | — |
| 3 | 5 | 183.4 | 43.65 | 90° C. | 40 | .867 | 3.64 | — | — |
| 4 | 5 | 103.8 | 24.70 | 70° C. | 40 | 2.02 | 8.49 | — | — |
| 5 | 21 | 34.9 | 5.27 | 70° C. | 40 | 2.78 | 18.4 | 0.75 | 8.98 |
| 6 | 26 | 30.5 | 3.51 | 70° C. | NO | .138 | 1.20 | 11.4 | — |
| 7 | 27 | 85.0 | 17.95 | 70° C. | 25 | 1.21 | 5.73 | 1.12 | 7.58 |

The activity results shown in Table 6 range from 1.2 to 18.4 kg/g/hr. when TMP was employed with TEA and DEAC as the cocatalyst. Note that Run 6 gave poor results when compared to the other runs, all of which use the invention catalyst. One possible explanation for this poor activity is the lack of hydrogen in the reaction.

The use of TMP in the cocatalyst appears to enhance the activity of the catalyst under certain conditions, compare Run 4 with catalyst 5, Table 1B results.

EXAMPLE VIII

Ethylene polymerization runs were conducted with individual portions of catalyst 1 precursor, designated 1 P, catalyst 1 and catalyst 5, all described in Example 1, and 1 mmole of TEA as cocatalyst. Polymerization was conducted in the 2 L reactor containing 1.25 lbs. of isobutane at a total reactor pressure of 565 psia. The pressure was maintained during a run from the addition of ethylene, as needed, from a pressurized reservoir. Hydrogen was employed in several runs for melt index control.

The reactor temperatures employed, actual run times used, hydrogen pressure employed, activity calculated for the actual run time and normalized to 60 minutes, when necessary, are given in Table 7. Also included is calculated activity per 60 minutes based on active catalyst contained in the supported catalyst.

TABLE 7

Ethylene Polymerization

| Run No. | Catalyst | | Reactor Temp °C. | H₂ Psi | Run Time Min. | Activities. kg/g Solid Cat./hr. | | Calc. 60 Min., Calc. Active Cat. |
|---|---|---|---|---|---|---|---|---|
| | No. | Wt. mg. | | | | Actual Per Run Time | Norm. 60 Min. | |
| 8 | 1P | 156.0 | 90 | 0 | 45 | 1.60 | 2.13 | 7.07 |
| 9 | 1 | 98.0 | 90 | 50 | 17 | 1.79 | 6.30 | 22.1 |

TABLE 7-continued

Ethylene Polymerization

| Run No. | Catalyst No. | Catalyst Wt. mg. | Reactor Temp °C. | H$_2$ Psi | Run Time Min. | Activities, kg/g Solid Cat./hr. Actual Per Run Time | Norm. 60 Min. | Calc. 60 Min., Calc. Active Cat. |
|---|---|---|---|---|---|---|---|---|
| 10 | 5 | 74.3 | 90 | 0 | 30 | 3.90 | 7.81 | 32.8 |
| 11 | 5 | 78.9 | 85 | 50 | 20 | 2.46 | 7.38 | 31.0 |
| 12 | 5 | 118.3 | 75 | 150 | 60 | 0.845 | — | 3.55 |

The activity results obtained ranging from about 0.9 to about 7.8 kg polyethylene per g active catalyst per 60 minutes indicate that the catalysts are active for ethylene polymerization at a variety of reactor temperatures and in the absence and presence of hydrogen as a reactor adjuvant. Even catalyst 1P, the precursor A composition itself is fairly active as an ethylene polymerization catalyst.

The polymer made with catalyst 1P in run 1 was in the form of granular fluff. Its melt index was not determined.

The polymer made with catalyst I in run 2 was in the form of granules and porous crystal-like particles. It has a melt index (MI) of 3.0 and high load melt index (HLMI; ASTM D 1238-65T) of 108. The HLMI/MI ratio of 36 is typical of ethylene polymers made with Ti-based catalysts.

The polymer made with catalyst 5 in run 4 was in the form of granules and large porous crystal-like particles. This polymer is depicted in the scanning electron microscope (SEM) photograph in FIG. 2B. Its melt index properties were not determined.

The polymer made with catalyst 5 in run 4 was in the form of rough spheres admixed with a few crystal-like particles. It had a MI of 0.43 and HLMI of 12.6. The HLMI/MI ratio of 29 is also typical of Ti-based catalyst.

The polymer made with catalyst 5 in run 5 was in the form of granules and small, porous crystal-like particles. It had a melt index of 3.2.

The examples have been provided merely to illustrate the practice of our invention and should not be read so as to limit the scope of our invention or the appended claims in any way. Reasonable variations and modifications, not departing from the essence and spirit of our invention, are contemplated to be within the scope of patent protection desired and sought.

That which is claimed is:

1. A method for the preparation of a crystalline olefin polymerization catalyst component which comprises:
    (a) contacting a magnesium dihalide with at least one transition metal compound in the presence of a diluent under conditions suitable for the formation of a soluble complex;
    (b) contacting said soluble complex produced in accordance with step (a) with about 0.1 to about 20 wt. percent based on said soluble complex of a particulate material consisting essentially of silica to produce a solid;
    (c) contacting said solid with about 0.1 to about 10 mole per mole transition metal compound of an organoaluminum halide to produce said catalyst component.
2. A method in accordance with claim 1 wherein said transition metal compound is a titanium alkoxide of the formula Ti(OR)$_4$, wherein each R is independently a C$_1$ up to C$_{10}$ carbon radical.
3. A method in accordance with claim 1 wherein said step a) further comprises the addition of an electron donor or mixture of electron donors selected from the group consisting of phenols and aromatic esters, wherein the molar ratio of said electron donor or mixture to said magnesium dihalide is in the range of 5:1 to 1:5.
4. A method in accordance with claim 3 wherein said electron donor is ethyl benzoate.
5. A method in accordance with claim 3 wherein said mixture of electron donors comprise ethyl benzoate and phenol.
6. A method in accordance with claim 3 wherein said mixture of electron donors comprises ethyl benzoate and 4-phenyl phenol.
7. A method in accordance with claim 3 further comprising contacting said catalyst component with at least one activating agent selected from the group consisting of:
    TiX$_4$,
    SiX$_4$,
    SiHX$_3$,
wherein X is a halogen.
8. A method in accordance with claim 1 wherein said particulate material is amorphous silica.
9. A method in accordance with claim 1 wherein said particulate material is substantially crystalline silica.
10. A method in accordance with claim 3 wherein said crystalline olefin polymerization catalyst component is further contacted with a cocatalyst comprising an organoaluminum compound, wherein the molar ratio of cocatalyst to transition metal compound of said first catalyst component is in the range of 1:1 to 1500:1.
11. A method in accordance with claim 10 wherein said olefin polymerization catalyst component is further contacted with a Lewis Base selected from aromatic esters and amines wherein the molar ratio of Lewis Base to organoaluminum cocatalyst is in the range of 0.1:1 to 0.6:1.
12. A method in accordance with claim 11 wherein said ester is selected from the group consisting of:
    ethyl benzoate, and
    ethyl anisate.
13. A method in accordance with claim 11 wherein said amine is 2,2,6,6-tetramethylpiperidine.
14. A method in accordance with claim 1 wherein the ratio of metal dihalide to transition metal compound in step (a) is in the range of about 10:1 to 1:10.
15. A catalyst produced by the method of claim 3.
16. A catalyst produced by the method of claim 8.
17. A catalyst produced by the method of claim 9.
18. A catalyst produced by the method of claim 10.
19. A catalyst produced by the method of claim 12.

* * * * *